US007932919B2

(12) United States Patent
Andrews et al.

(10) Patent No.: US 7,932,919 B2
(45) Date of Patent: Apr. 26, 2011

(54) VIRTUAL RING CAMERA

(75) Inventors: Carlton A. Andrews, Austin, TX (US);
Roy W. Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1348 days.

(21) Appl. No.: 11/408,876

(22) Filed: Apr. 21, 2006

(65) Prior Publication Data

US 2007/0263076 A1    Nov. 15, 2007

(51) Int. Cl.
*H04N 7/15* (2006.01)
(52) U.S. Cl. ...................................... 348/14.08
(58) Field of Classification Search ............... 348/14.08, 348/14.09, 14.01, 14.07; 370/260
See application file for complete search history.

(56) References Cited

U.S. PATENT DOCUMENTS

| 4,664,496 | A   | 5/1987 | Shinoda et al. ............... 354/420 |
| 6,539,499 | B1  | 3/2003 | Stedman et al. ............... 714/40 |
| 6,606,716 | B1  | 8/2003 | Vrhel, Jr. et al. ............... 714/32 |
| 7,034,860 | B2* | 4/2006 | Lia et al. ..................... 348/14.09 |
| 7,675,537 | B2* | 3/2010 | Wilson et al. .............. 348/14.08 |
| 2004/0041909 | A1 | 3/2004 | Horie et al. ................... 348/143 |
| 2004/0052450 | A1 | 3/2004 | Morrison ........................ 385/24 |
| 2005/0122392 | A1* | 6/2005 | Johansen et al. .......... 348/14.09 |
| 2005/0151836 | A1 | 7/2005 | Ni ............................... 348/14.09 |
| 2005/0207433 | A1 | 9/2005 | Ni .................................. 370/401 |

OTHER PUBLICATIONS http://research.microsoft.com/~rcutler/ringcam/ringcam.htm, 2 pages, printed Aug. 1, 2006.

* cited by examiner

*Primary Examiner* — Stella L Woo
(74) *Attorney, Agent, or Firm* — Hamilton & Terrile, LLP; Gary W. Hamilton

(57) ABSTRACT

A system and method for a virtual omni-directional camera array, comprising a video control system (VCS) coupled to two or more co-located portable or stationary information processing systems, each enabled with a video camera and microphone, to provide a composite video view to remote videoconference participants. Audio streams are captured and selectively mixed to produce a virtual array microphone as a clue to selectively switch or combine the video streams from individual cameras. The VCS selects and controls predetermined subsets of video and audio streams from the co-located video camera and microphone-enabled computers to create a composite video view, which is then conveyed to one or more similarly-enabled remote computers over a broadband network (e.g., the Internet). Manual overrides allow participants or a videoconference operator to select predetermined video streams as the primary video view of the videoconference.

20 Claims, 11 Drawing Sheets

VIRTUAL RING CAMERA

BACKGROUND OF THE INVENTION

1. Field of the Invention

The present invention relates in general to the field of video image processing, and more specifically, to the selective display of video images in a videoconference.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The evolution of information handling systems and the growing ubiquity of network connectivity is making it increasingly possible to be connected, anytime, any place, for any reason. This trend has become particularly relevant in the workplace, where the value of timely and effective communication between individuals is well recognized. Yet co-workers are not always able to personally be present for meetings due to scheduling conflicts, the rising cost of travel and other constraints. As a result, remotely participating in meetings has become more common. In the past, remote meeting participation was primarily through teleconferencing, but videoconferencing is gaining in popularity as equipment and high-speed network connectivity has become more available and affordable. Another emerging trend is the availability of personal video teleconference systems based on a webcam, personal computer system, inexpensive or free videoconferencing applications and broadband Internet connectivity. This technology is currently available on portable information handling systems such as laptop computers and has improved to the point where it will soon be incorporated into other portable devices such as personal digital assistants (PDAs) and wireless phones. While personal videoconferencing has its advantages, issues remain for its widespread adoption for multi-participant videoconferencing use.

Traditional desktop videoconferencing also has issues according to the video and audio capture technologies employed, which can include pan/tilt/zoom (PTZ) cameras, mirror-based omni-directional cameras, omni-directional camera arrays, directional microphones and multi-microphone arrays. PTZ cameras are currently the most common video capture solution, and have the advantage of being able to pan across a room and zoom in on a presenter or out to include a group. Mirror-based, omni-directional cameras incorporate mirrors to provide a 360 degree view, which the viewer can control much as they would a PTZ camera. Another mirror-based camera unwarps a spherically-distorted video stream into a rectilinear view. Yet another approach is to assemble multiple inexpensive cameras to form an omni-directional camera array, such as the RingCam developed by Microsoft Corporation. As typically implemented, five IEEE 1394 "Firewire" cameras are oriented in a pinwheel configuration. Each camera covers a 72 degree field of view, which can be displayed separately or stitched together (i.e., concatenated), to provide a virtual panoramic view of the videoconference room. In addition, a corresponding array of directional microphones can be implemented to identify the direction of the current speaker through sound source localization and then improve the sound quality of their audio signals.

Each of these prior art approaches presents attendant issues. For example, the context of a meeting can be lost if a PTZ camera zooms in too fast or too close. Conversely, if it zooms out too far, speaker expressions are lost. Plus, response time for camera movements is typically slow and distracting at the same time. In addition, PTZ cameras are usually mounted in a stationary location, usually along one axis of a conference table, which limits their angle and field of view. Omni-directional cameras are likewise stationary, but are more likely to be installed in the center of a conference table. In either case, the standard wide-angle perspective image they generate results in image foreshortening that causes participants sitting at the far end of the table to appear small relative to those sitting near the camera. This makes it difficult for remote participants to see the faces or expressions of those at the far end of the table. Furthermore, when trying to include all participants, screen space is wasted on the background instead of the faces of the meeting participants. Similar issues exist with audio quality. Users that are close to general purpose microphones are too loud and those that are further away are too difficult to hear. Likewise, directional microphones may be too selective, as they may not be sufficiently aimed at the current speaker. Furthermore, they may not provide sufficient overlap in their coverage when implemented in conjunction with an omni-directional camera array. In consideration of the foregoing, there is a need for improving the video view and corresponding audio quality of videoconferencing.

SUMMARY OF THE INVENTION

In accordance with the present invention, a system and method is disclosed for a virtual omni-directional camera array that provides an improved composite video view to remote videoconference participants. Specifically, the virtual omni-directional camera array comprises a video control system (VCS) coupled to two or more co-located portable or stationary information processing systems, each comprising a video camera and microphone. The VCS selects and controls predetermined subsets of video and audio streams from the co-located video camera and microphone-enabled computers to create a composite video view, which is then conveyed to one or more similarly-enabled remote computers over a broadband network (e.g., the Internet). In an embodiment of the invention, the video information is conveyed on the broadband network using an implementation of the Real-Time Communications (RTC) protocol familiar to those of skill in the art.

As typically implemented, video cameras comprising the virtual omni-directional camera array are oriented such that the computer user will be in the camera's local field of view. In an embodiment of the invention, the video control system "stitches" together, or concatenates, video streams from co-located computers into a virtual panoramic view that is viewable by remote videoconference participants. In another embodiment of the invention, audio streams are captured and selectively mixed to produce a virtual array microphone as a clue to selectively switch or combine the video streams from the individual cameras. For example, the current speaker in a videoconference is determined by an audio stream processing algorithm implemented in the VCS, which selects their corresponding video stream and presents it as the primary video view for the videoconference. As speakers change, the audio stream processing algorithm determines their associated video stream and displays it as the primary video image for the videoconference. In another embodiment of the invention, if two or more participants are speaking concurrently, or within a predetermined time interval, their respective video streams are combined into a composite video view. In another embodiment of the invention, manual overrides allow participants to select predetermined video streams as their primary video view for the videoconference. In another embodiment of the invention, a videoconference facilitator or operator selects the primary view for the videoconference from thumbnail images representing available video streams.

In an embodiment of the invention, composite video streams from the virtual omni-directional camera array are presented via driver middleware to appear as standard audio and video devices, such that they can be used with commonly available real-time communications software (e.g., MSN Messenger, produced by Microsoft Corporation, Polycom PVX, produced by Polycom, Incorporated, etc.) implemented on the VCS. In another embodiment of the invention, composite video streams are created and conveyed to remote videoconferencing participants through the implementation of a purpose-built RTC application in a dedicated videoconferencing system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for a virtual omni-directional camera array, comprising a video control system (VCS) coupled to two or more co-located portable or stationary information processing systems, each enabled with a video camera and microphone, to provide an improved composite video view to remote videoconference participants.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
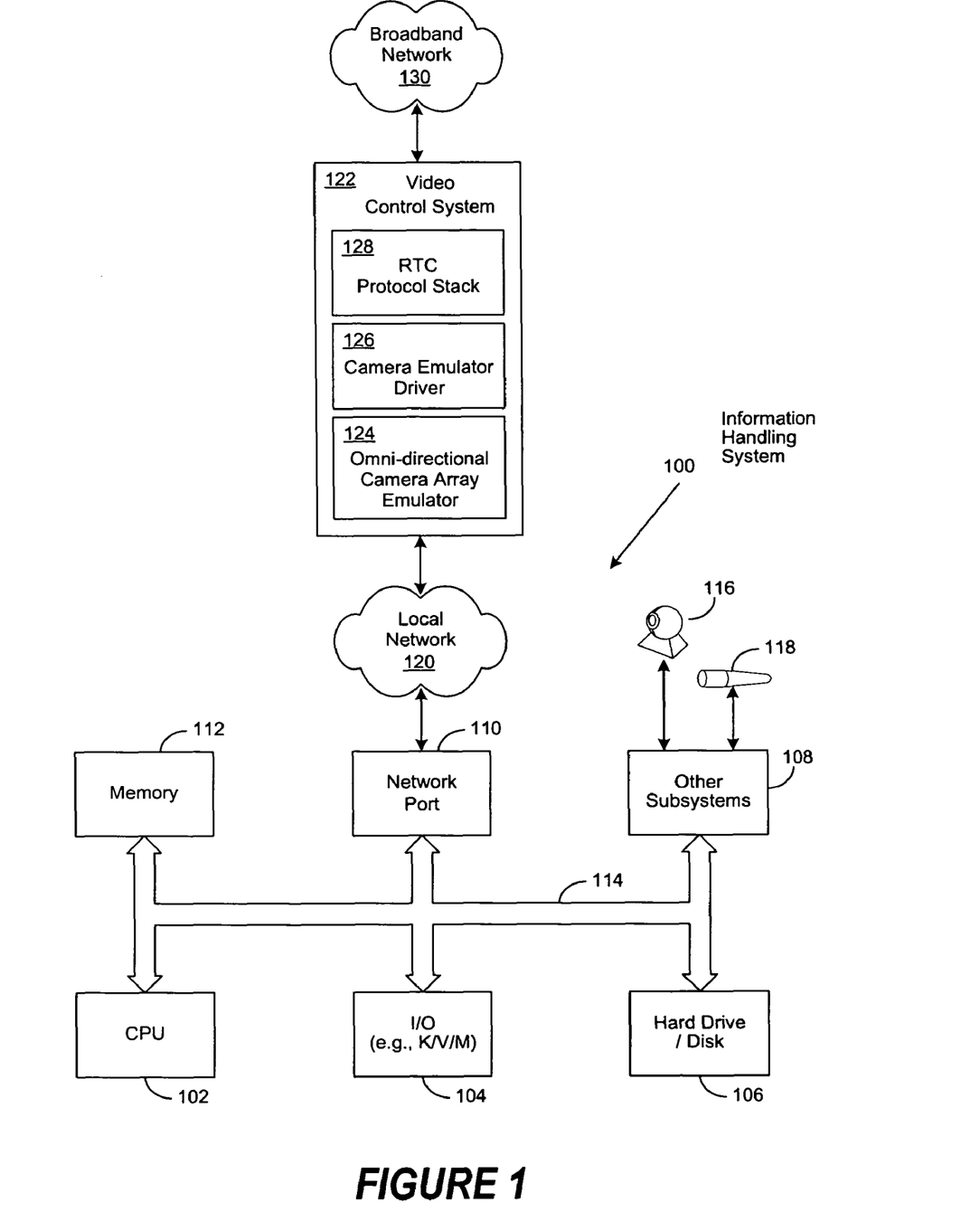
FIG. 1 is a generalized illustration of an information handling system that can be used to implement the method and apparatus of the present invention.

FIG. 1 is a generalized illustration of an information handling system 100 that can be used to implement the method and apparatus of the present invention. The information handling system includes a processor 102, input/output (I/O) devices 104, such as a display, a keyboard, a mouse, and associated controllers, a hard disk drive 106, other storage subsystems 108, such as a video camera 116 and microphone 118, network port 110, all interconnected via one or more buses 114.

Network port 110 couples information handling system 100 to video control system (VCS) 122, via local network 120, such as but not limited to, a Local Area Network (LAN) or a wireless Local Area Network (WLAN). Video control system 122 comprises omni-directional camera array emulator 124, camera emulator driver 126, and Real Time Communications (RTC) protocol stack 128, and is coupled to broadband network 128, such as the Internet or a corporate intranet, or a combination of public and/or private network technologies and protocols that may be required to transport data packets between one or more information handling systems.

In an embodiment of the invention, composite video streams from the virtual omni-directional camera array are presented via driver middleware to appear as standard audio and video devices (e.g., camera emulator driver 126), such that they can be used with commonly available real-time communications software (e.g., MSN Messenger, produced by Microsoft Corporation, Polycom PVX, produced by Polycom, Incorporated, etc.) implemented on VCS 122. In another embodiment of the invention, composite video streams are created and conveyed to remote videoconferencing participants through the implementation of a purpose-built RTC application on VCS 122 to comprise a dedicated videoconferencing system.

Figure 2A:
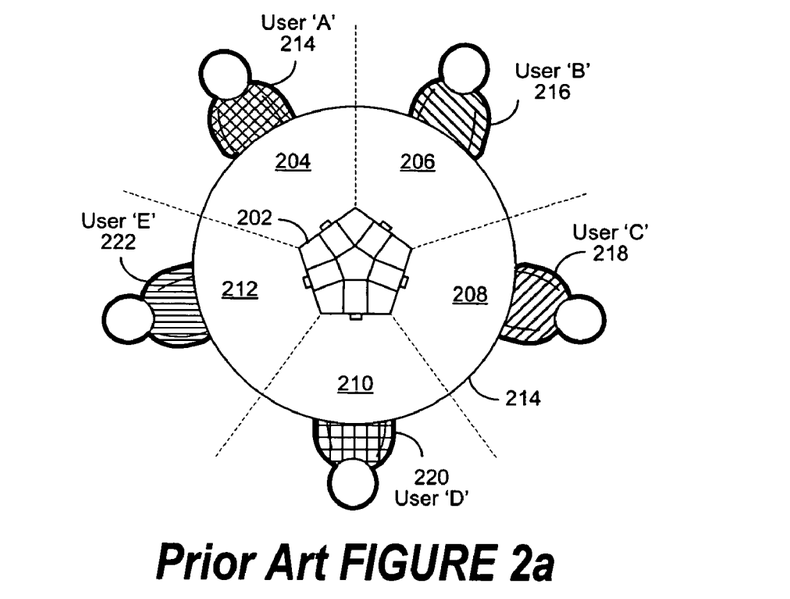
FIGS. 2a-b are generalized depictions of a prior art omni-directional camera array as commonly implemented in the center of videoconference room table to create a virtual panoramic view.

FIG. 2a is a generalized depiction of a prior art omni-directional camera array 202 as commonly implemented in the center of videoconference room table 214. In this depiction, omni-directional camera array 202 comprises five IEEE 1394 "Firewire" cameras implemented in a pinwheel configuration, with each camera providing fixed, 72 degree angles of view 204, 206, 208, 210, 212 respectively for users 'A' 204, 'B' 206, 'C' 208, 'D' 210, and 'E' 216.

Figure 2B:
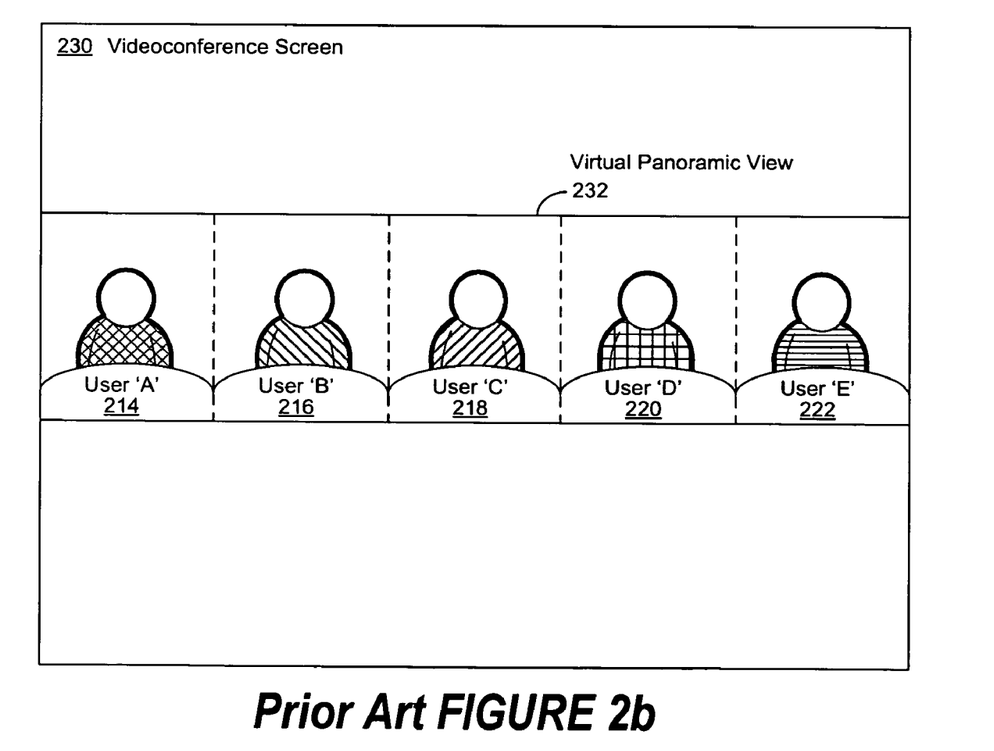

FIG. 2b is a generalized depiction of virtual panoramic view 232 created by prior art omni-directional camera array 202. In this depiction, the video images of users 'A' 214, 'B' 216, 'C' 218, 'D' 220, and 'E' 222 are stitched together (i.e., concatenated) by combining the fixed, 72 degree angles of view 204, 206, 208, 210, 212 of omni-directional camera array 202 to create virtual panoramic view 232, which is displayed in videoconference screen 230. In this same depiction, video image size of users 'A' 214, 'B' 216, 'C' 218, 'D' 220, and 'E' 222 within virtual panoramic view 232 is dependent upon their distance from omni-directional camera array 202.

Figure 3A:
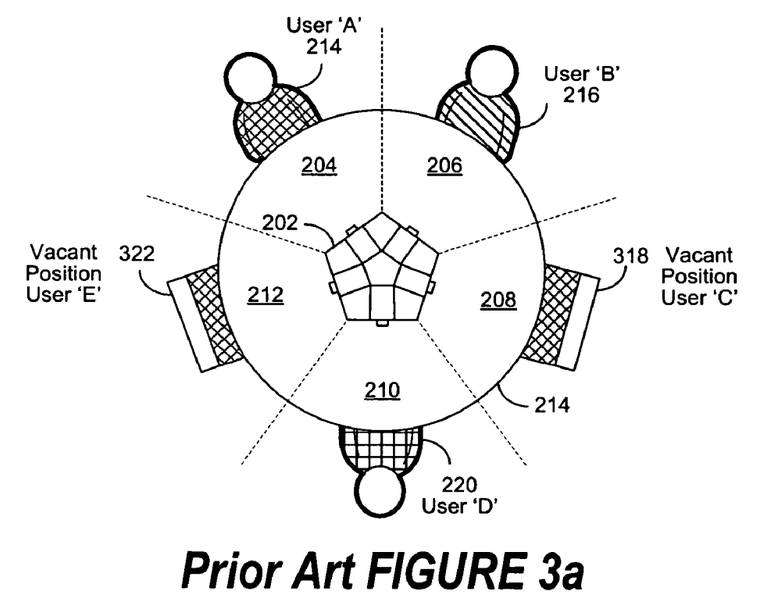
FIGS. 3a-b are additional generalized depictions of a prior art omni-directional camera array as commonly implemented in the center of videoconference room table to create a virtual panoramic view.

FIG. 3a is another generalized depiction of a prior art omni-directional camera array 202 as commonly implemented in the center of videoconference room table 214. In this depiction, omni-directional camera array 202 comprises five IEEE 1394 "Firewire" cameras implemented in a pinwheel configuration, with each camera providing fixed, 72 degree angles of view 204, 206, 208, 210, 212 respectively for users 'A' 214, 'B' 216, vacant position for user 'C' 318, 'D' 210, and vacant position for user 'E' 322.

Figure 3B:
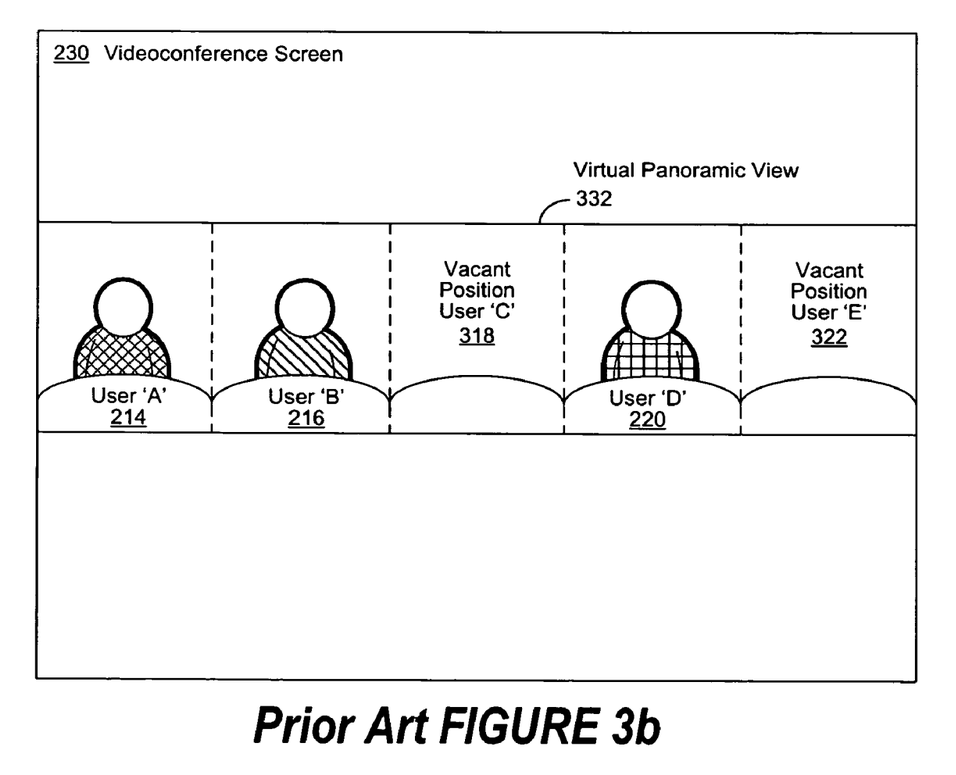

FIG. 3b is a generalized depiction of virtual-panoramic-view 323 created by prior art omni-directional camera array 202. In this depiction, the video images of users 'A' 214, 'B' 216, vacant position for user 'C' 318, 'D' 210, and vacant position for user 'E' 322 are stitched together (i.e., concatenated) by combining the fixed, 72 degree angles of view 204, 206, 208, 210, 212 of omni-directional camera array 202 to create virtual panoramic view 332, which is displayed in videoconference screen 230. In this same depiction, video image size of users 'A' 214, 'B' 216, and 'D' 220 within virtual panoramic view 332 remain the same size as if the vacant positions for user 'C' 318 and 'E' 322 were occupied, and is further dependent upon their distance from omni-directional camera array 202. Furthermore, additional videoconference screen space is lost due to the displayed images of vacant positions for users 'C' 318 and 'E' 322.

Figure 4:
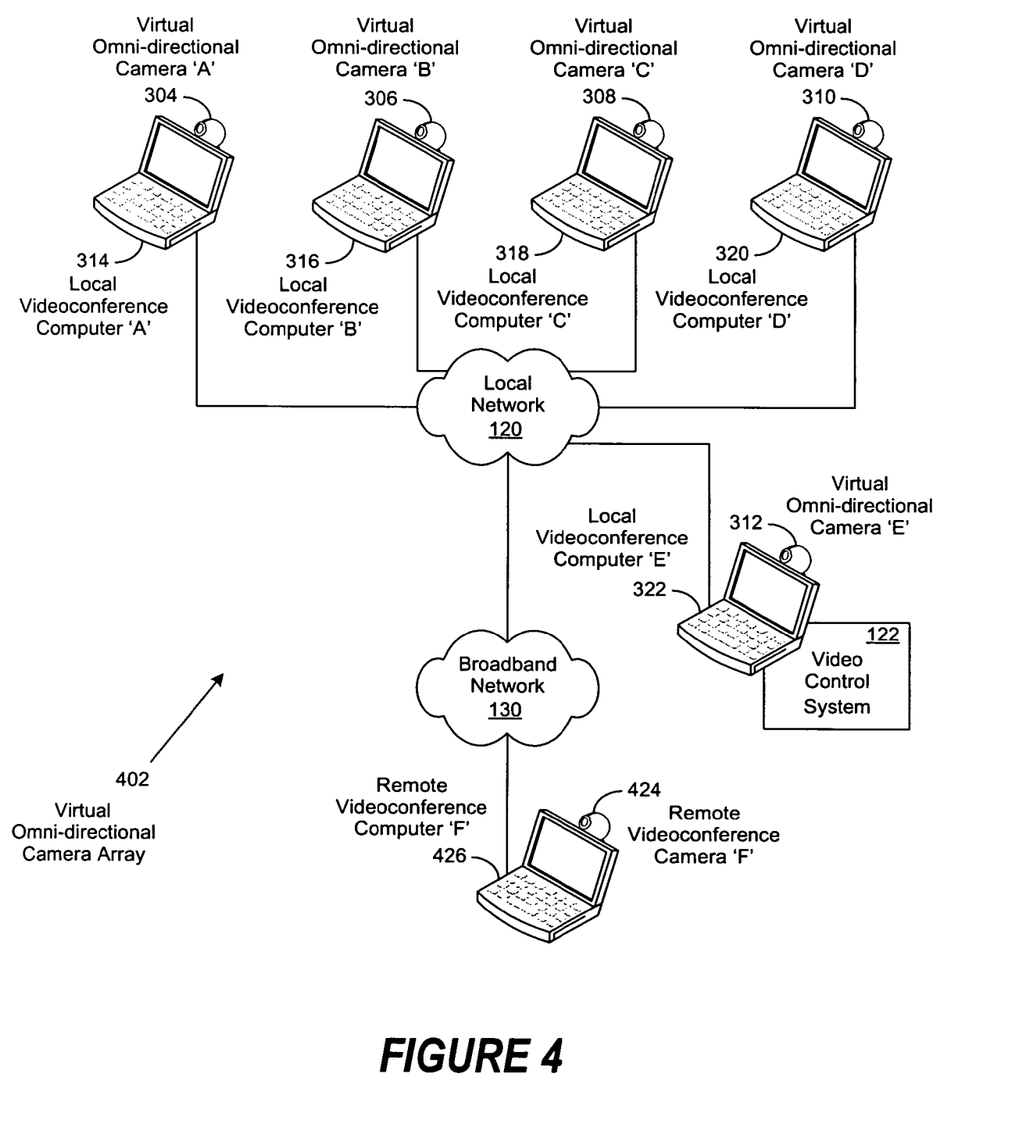
FIG. 4 is a generalized block diagram illustration of a virtual omni-directional camera array with a video control system (VCS) implemented on a local videoconference computer in accordance with an embodiment of the invention.

FIG. 4 is a generalized block diagram illustration of a virtual omni-directional camera array 402 with video control system 122 implemented on local videoconference computer 'E' 322 in accordance with an embodiment of the invention. In this illustration, virtual omni-directional camera array 402 comprises virtual omni-directional cameras 'A' 304, 'B' 306, 'C' 308, 'D' 310, and 'E' 312, respectively implemented on local videoconference computers 'A' 314, 'B' 316, 'C' 318, 'D' 320 and 'E' 322 coupled by local network 120 as described in greater detail hereinabove. In this same illustration, video control system (VCS) 122 is implemented on local videoconference computer 'E' 322 to control videoconference views, communicated via broadband network 130 as described in greater detail hereinabove, to and from remote videoconference computer 'F' 426 comprising remote videoconference camera 'F' 424.

Figure 5:
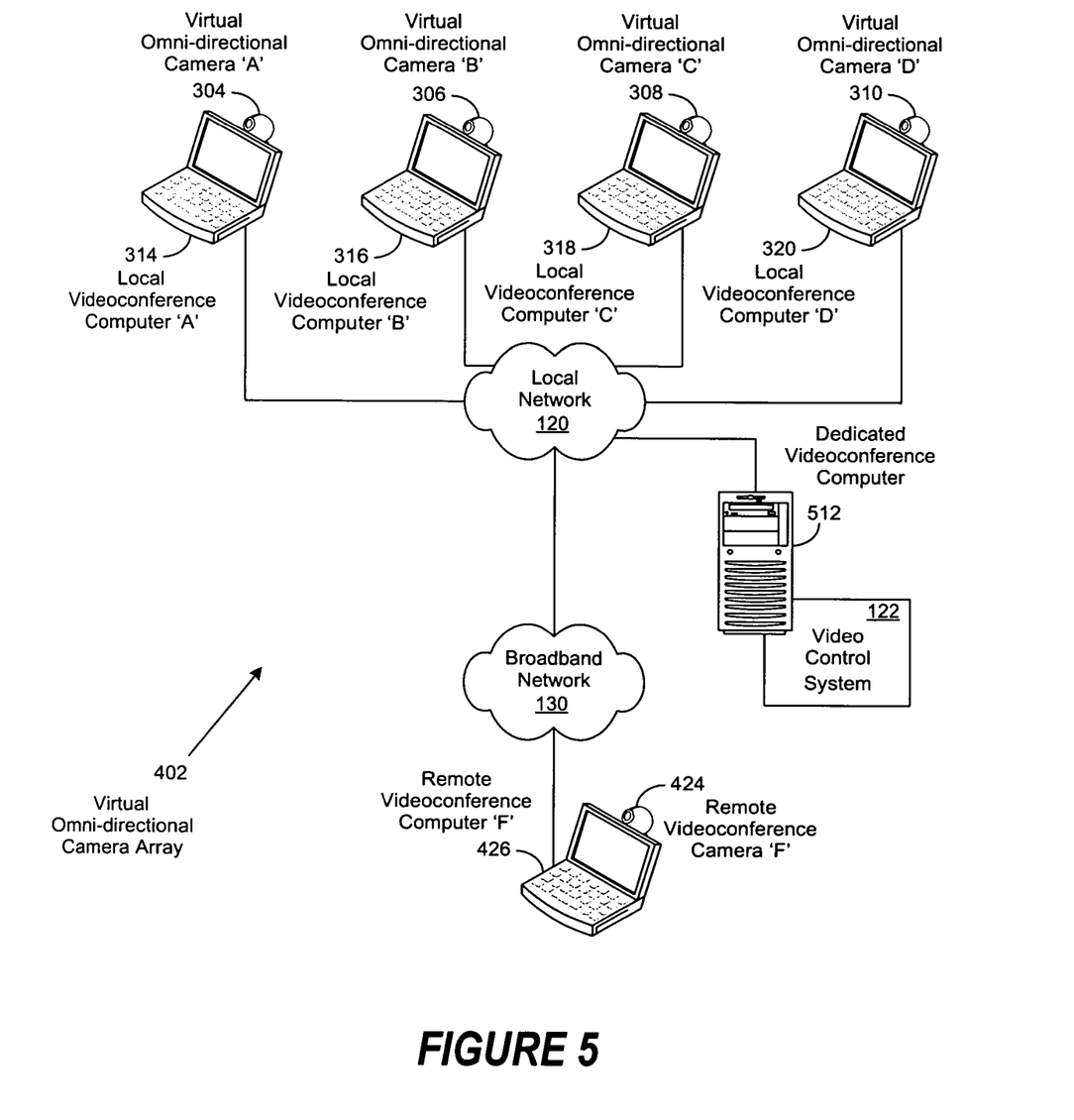
FIG. 5 is a generalized block diagram illustration of a virtual omni-directional camera array with a VCS implemented on a dedicated videoconference computer in accordance with an embodiment of the invention.

FIG. 5 is a generalized block diagram-illustration of a virtual omni-directional camera array 402 with video control system 122 implemented on dedicated videoconference computer 512 in accordance with an embodiment of the invention. In this illustration, virtual omni-directional camera array 402 comprises virtual omni-directional cameras 'A' 304, 'B' 306, 'C' 308, 'D' 310, respectively implemented on local videoconference computers 'A' 314, 'B' 316, 'C' 318, 'D' 320, and dedicated videoconference computer 512 coupled by local network 120 as described in greater detail hereinabove. In this same illustration, video control system (VCS) 122 is implemented on dedicated videoconference computer 512 to control videoconference views, communicated via broadband network 130 as described in greater detail hereinabove, to and from remote videoconference computer 'F' 426 comprising remote videoconference camera 'F' 424.

Figure 6:
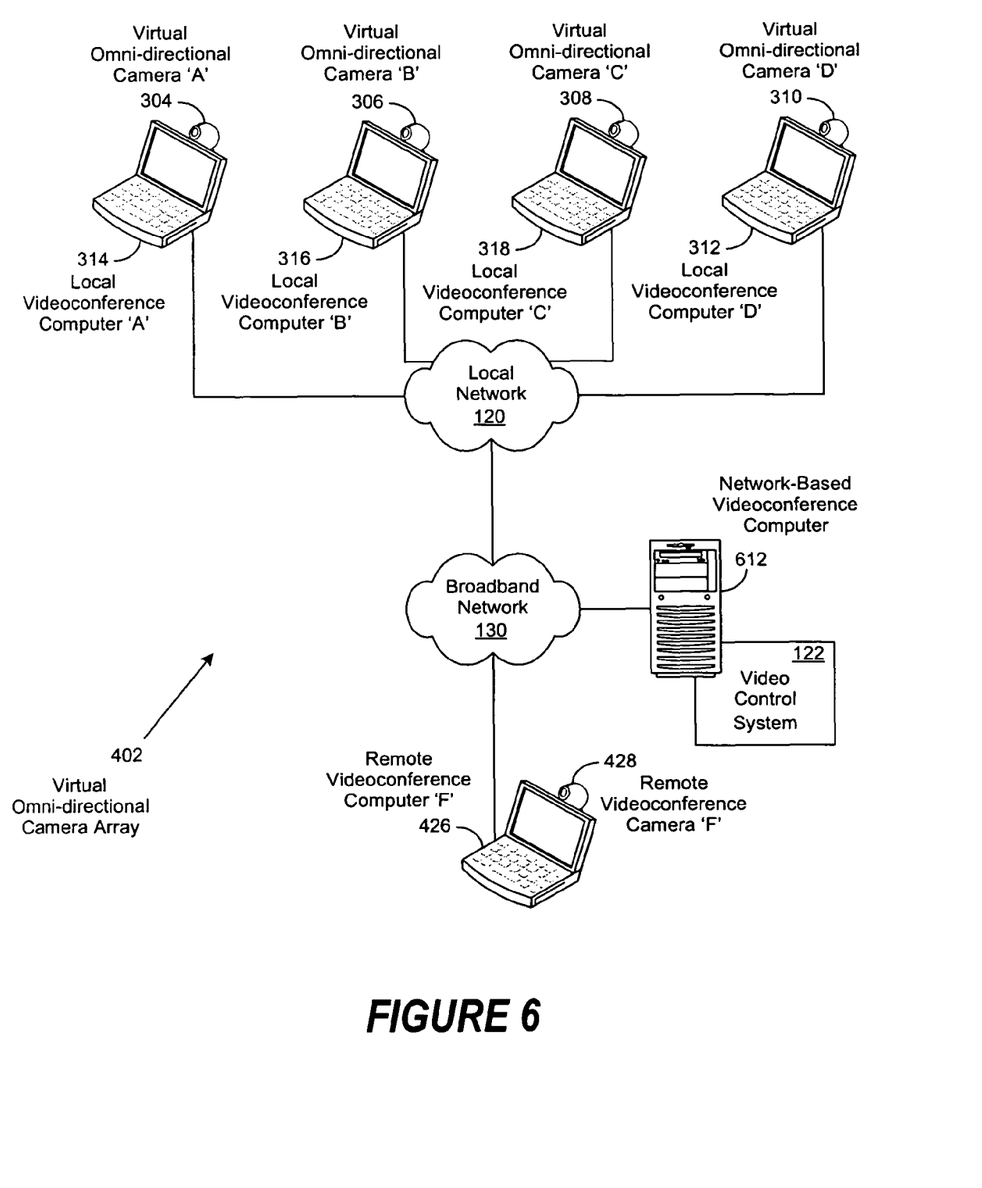
FIG. 6 is a generalized block diagram illustration of a virtual omni-directional camera array with a VCS implemented on a network-based videoconference computer in accordance with an embodiment of the invention.

FIG. 6 is a generalized block diagram illustration of a virtual omni-directional camera array 402 with video control system 122 implemented on network-based videoconference computer 612 in accordance with an embodiment of the invention. In this illustration, virtual omni-directional camera array 402 comprises virtual omni-directional cameras 'A' 304, 'B' 306, 'C' 308, 'D' 310, respectively implemented on local videoconference computers 'A' 314, 'B' 316, 'C' 318, 'D' 320, and network-based videoconference computer 612 coupled by local network 120 as described in greater detail hereinabove. In this same illustration, video control system (VCS) 122 is implemented on network-based videoconference computer 612 to control videoconference views, communicated via broadband network 130 as described in greater detail hereinabove, to and from remote videoconference computer 'F' 426 comprising remote videoconference camera 'F' 424.

Figure 7A:
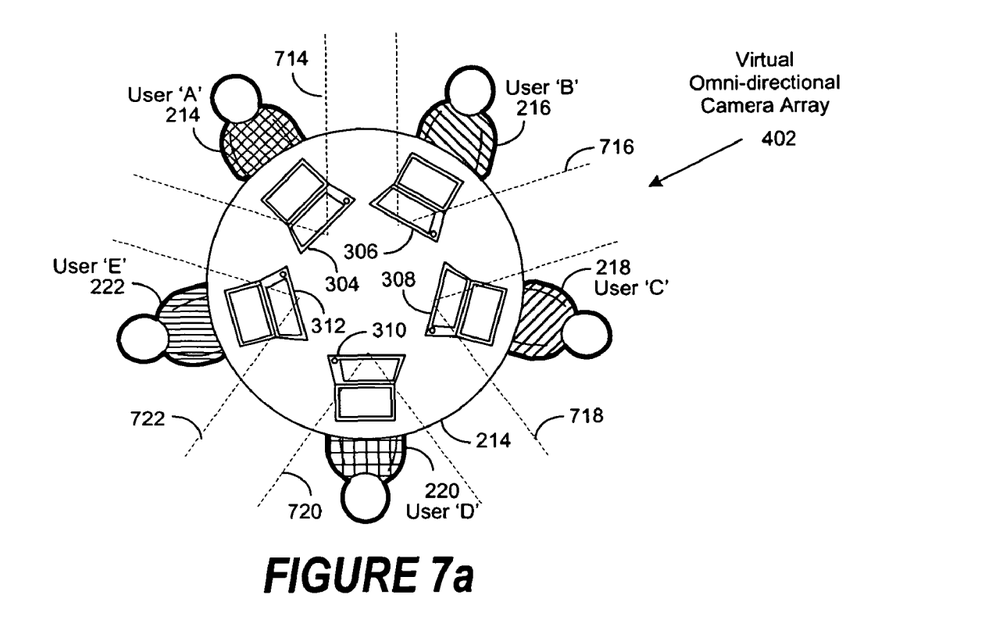
FIGS. 7a-b are generalized depictions of a virtual omni-directional camera array as implemented in the center of a videoconference room table in accordance with an embodiment of the invention to provide an enhanced virtual panoramic view.

FIG. 7a is a generalized depiction of a virtual-omni-directional camera array 402 as implemented in the center of videoconference room table 214 in accordance with an embodiment of the invention. In this depiction, virtual omni-directional camera array 402 comprises virtual omni-directional cameras 'A' 304, 'B' 306, 'C' 308, 'D' 310, and 'E' 312, respectively implemented on local videoconference computers 'A' 314, 'B' 316, 'C' 318, 'D' 320 and 'E' 322 as described in greater detail hereinabove. In this same depiction, virtual omni-directional cameras 'A' 304, 'B' 306, 'C' 308, 'D' 310, and 'E' 312 each provide local angles of view 714, 716, 718, 720, and 722 respectively for users 'A' 204, 'B' 206, 'C' 208, 'D' 210, and 'E' 216.

Figure 7B:
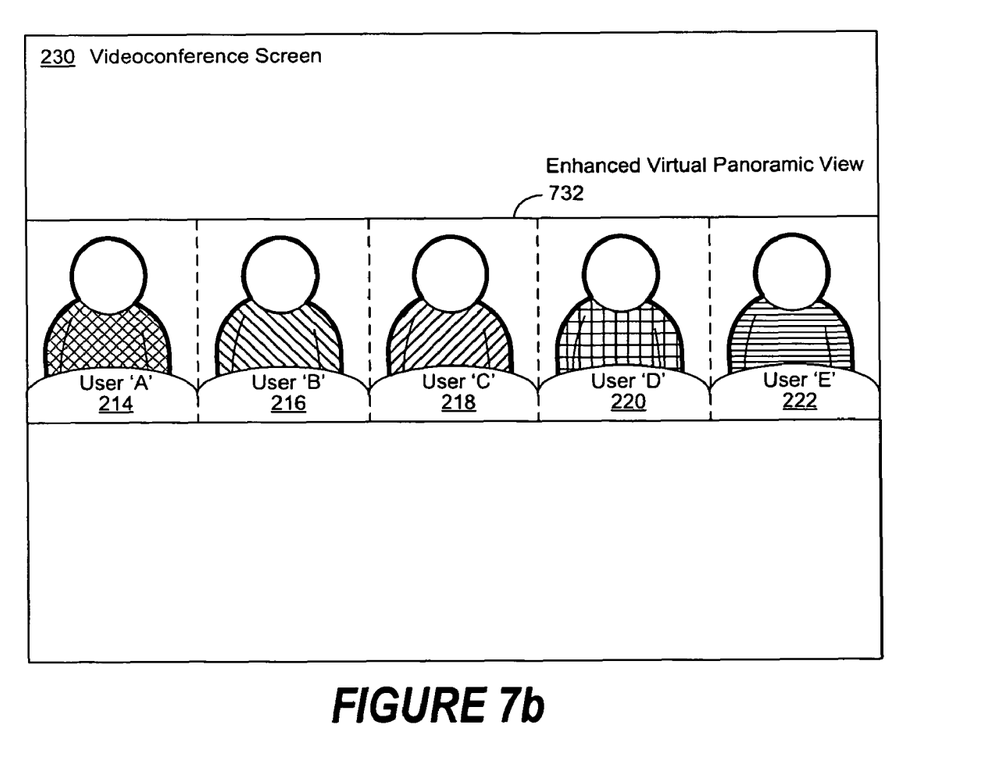

FIG. 7b is a generalized depiction of enhanced virtual panoramic view 732 as implemented on videoconference screen 230 by virtual omni-directional camera array 402 in accordance with an embodiment of the invention. In this depiction, the video images of users 'A' 214, 'B' 216, 'C' 218, 'D' 220, and 'E' 222 are stitched together (i.e., concatenated) by combining the respective local angles of view 714, 716, 718, 720, and 722 of virtual omni-directional cameras 'A' 304, 'B' 306, 'C' 308, 'D' 310, and 'E' 312 comprising virtual omni-directional camera array 402 to create enhanced virtual panoramic view 732, which is displayed in videoconference screen 230. It will be apparent to those of skill in the art that the respective video image size of users 'A' 214, 'B' 216, 'C' 218, 'D' 220, and 'E' 222 within enhanced virtual panoramic view 732 is dependent upon the local angles of view 714, 716, 718, 720, 722, of virtual omni-directional cameras 'A' 304, 'B' 306, 'C' 308, 'D' 310, and 'E' 312, comprising omni-directional camera array 402.

Figure 8A:
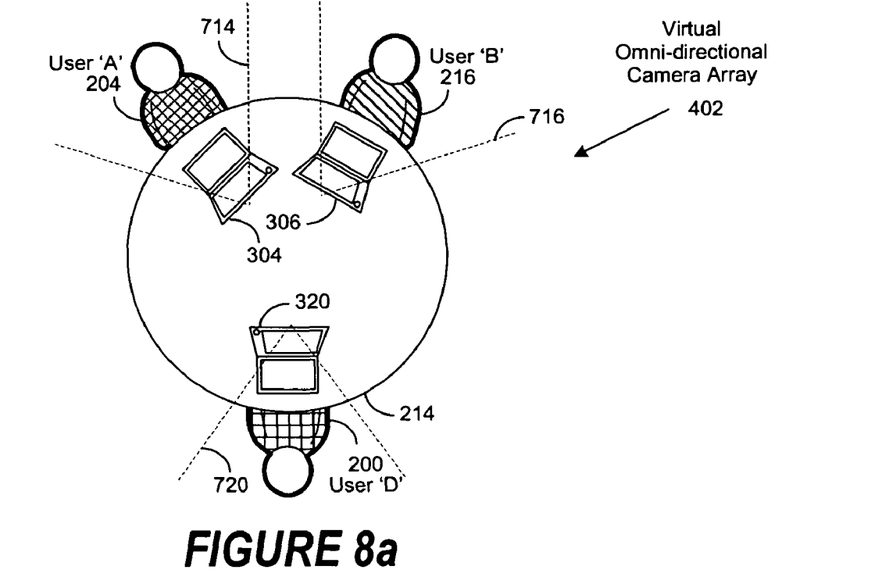
FIGS. 8a-b are generalized depictions of a virtual omni-directional camera array as implemented in the center of a videoconference room table in accordance with an embodiment of the invention to provide a resized virtual panoramic view.

FIG. 8a is another generalized depiction of a virtual omni-directional camera array 402 as implemented in the center of videoconference room table 214 in accordance with an embodiment of the invention. In this depiction, virtual omni-directional camera array 402 comprises virtual omni-directional cameras 'A' 304, 'B' 306, and 'D' 310, respectively implemented on local videoconference computers 'A' 314, 'B' 316, and 'D' 320 as described in greater detail hereinabove. In this same depiction, virtual omni-directional cameras 'A' 304, 'B' 306, and 'D' 310 each provide local angles of view 714, 716, and 720 respectively for users 'A' 204, 'B' 206, and 'D' 210.

Figure 8B:
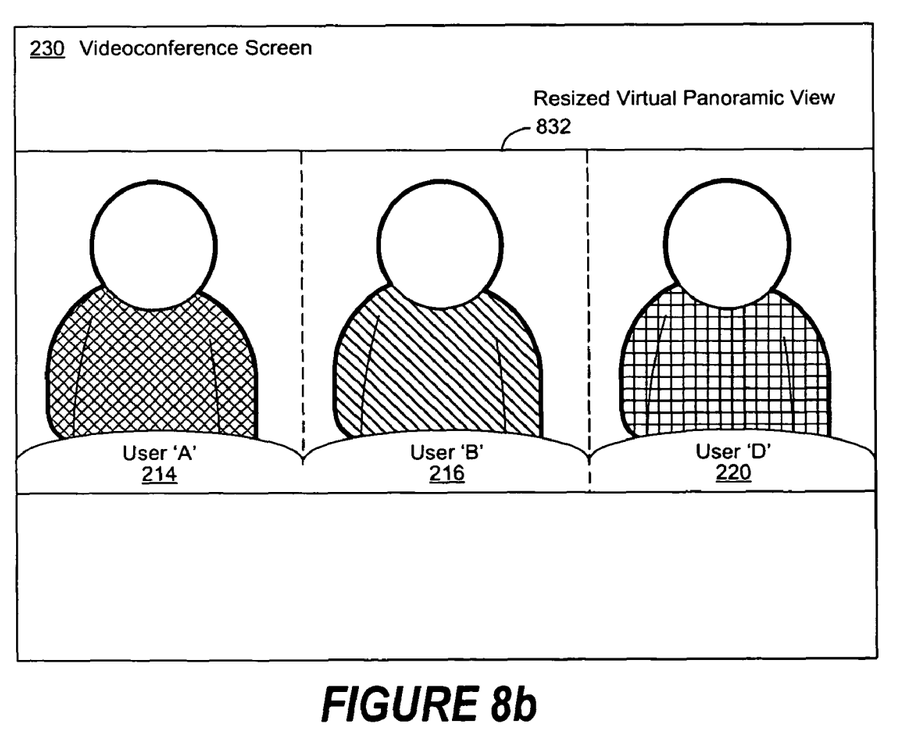

FIG. 8b is a generalized depiction of resized virtual panoramic view 832 as implemented on videoconference screen 230 by virtual omni-directional camera array 402 in accordance with an embodiment of the invention. In this depiction, the video images of users 'A' 214, 'B' 216, and 'D' 220 are stitched together (i.e., concatenated) by combining the respective local angles of view 714, 716, and 722 of virtual omni-directional cameras 'A' 304, 'B' 306, and 'D' 310 comprising virtual omni-directional camera array 402 to create virtual panoramic view 832, which is displayed in videoconference screen 230. In this same depiction, the video image size of users 'A' 214, 'B' 216, and 'D' 220 is typically larger and more easily viewed as there are fewer video images to be displayed, allowing the images to be enlarged to comprise resized virtual panoramic view 832. It will be apparent to those of skill in the art that the respective video image size of users 'A' 214, 'B' 216, and 'D' 220 within resized virtual panoramic view 832 is dependent upon the local angles of view 714, 716, 718, 720, 722, of virtual omni-directional cameras 'A' 304, 'B' 306, 'C' 308, 'D' 310, and 'E' 312, comprising omni-directional camera array 402.

Figure 9A:
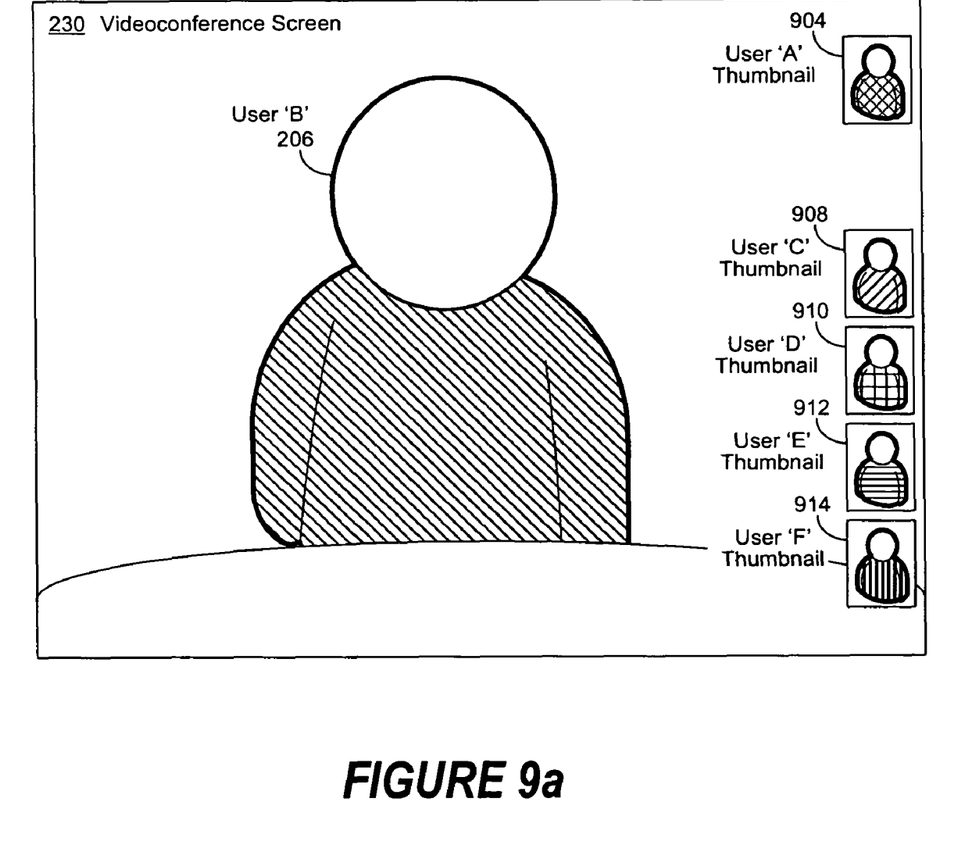
FIGS. 9a-c are generalized depictions of selectively displayed full-screen and composite images as displayed on a videoconference screen in an implementation of virtual omni-directional camera array in accordance with an embodiment of the invention.

FIG. 9a is a generalized depiction of a full-screen view of local videoconference user 'B' 206 selected for display on videoconference screen 230 in an implementation of virtual omni-directional-camera array 402 in accordance with an embodiment of the invention. In this depiction, videoconference screen 230 comprises a full-screen view of videoconference user 'B' 206, local videoconference user thumbnails 'A' 904, 'C' 908, 'D' 910, 'E' 912, and remote videoconference user thumbnail 'F' 914. In this embodiment of the invention, audio streams from microphones implemented in local videoconference computers 'A' 314, 'B' 316, 'C' 318, 'D' 320, 'E' 322, and remote videoconference computer 'F' 426 are captured and analyzed by an audio stream processing algorithm implemented on video control system (VCS) 122 to selectively switch or combine the video streams from virtual omni-directional cameras 'A' 304, 'B' 306, 'C' 308, 'D' 310, and 'E' 312, comprising omni-directional camera array 402, and remote video conference camera 'F' 424. In this same embodiment of the invention, local user 'B' 206 is determined to be the current speaker in a videoconference by an audio stream processing algorithm implemented in VCS 122, which selects the corresponding video stream of local user 'B' 206 and presents it as the current full-screen video view image on videoconference screen 230, with local videoconference user thumbnails 'A' 904, 'C' 908, 'D' 910, 'E' 912, and remote videoconference user thumbnail 'F' 914 being similarly displayed.

Figure 9B:
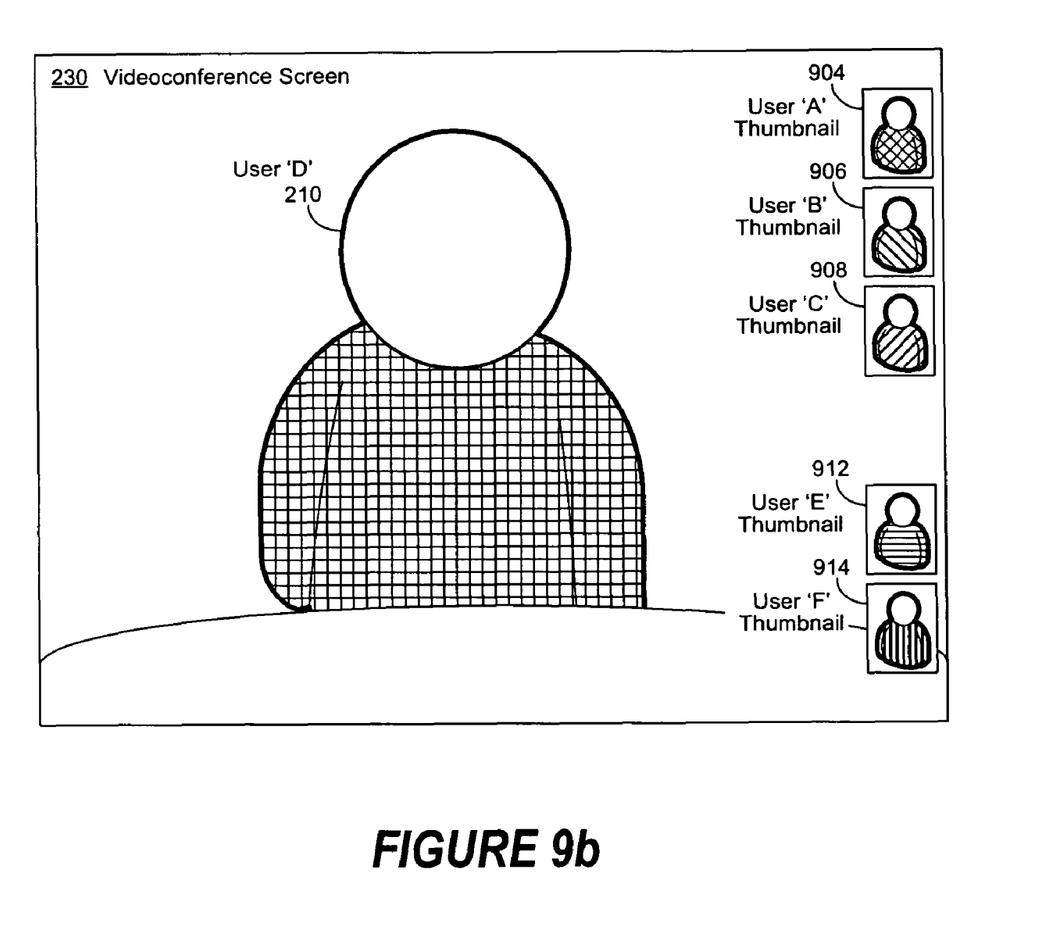

FIG. 9b is a generalized depiction of a full-screen view of local videoconference user 'D' 210 selected for display on videoconference screen 230 in an implementation of virtual omni-directional camera array 402 in accordance with an embodiment of the invention. In this depiction, videoconference screen 230 comprises a full-screen view of videoconference user 'D' 210, local videoconference user thumbnails 'A' 904, 'B' 206, 'C' 908, 'E' 912, and remote videoconference user thumbnail 'F' 914. In this embodiment of the invention, audio streams from microphones implemented on local video conference computers 'A' 314, 'B' 316, 'C' 318, 'D' 320, 'E' 322, and remote videoconference computer 'F' 426 are captured and analyzed by an audio stream processing algorithm implemented on video control system (VCS) 122 to selectively switch or combine the video streams from virtual omni-directional cameras 'A' 304, 'B' 306, 'C' 308, 'D' 310, and 'E' 312, comprising omni-directional camera array 402, and remote video conference camera 'F' 424.

In this same embodiment of the invention, local user 'D' 210 has been determined to be the current speaker in a videoconference by an audio stream processing algorithm implemented in VCS 122, which selects the corresponding video stream of local user 'B' 206 and presents it as the current full-screen video view image on videoconference screen 230, with local videoconference user thumbnails 'A' 904, 'B' 906, 'C' 908, 'E' 912, and remote videoconference user thumbnail 'F' 914 being similarly displayed. As speakers change, the audio stream processing algorithm implemented in VCS 122 determines the associated video stream of the user and displays it as the primary video image for the videoconference.

Figure 9C:
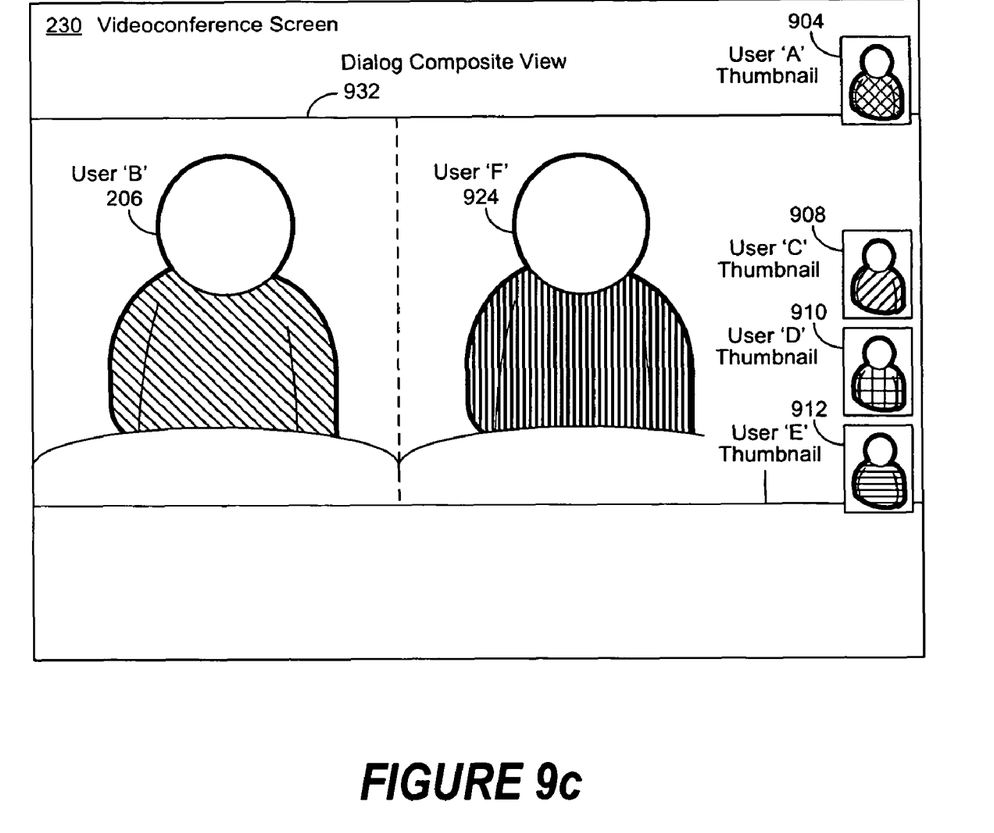

FIG. 9c is a generalized depiction of partial-screen views of local videoconference user 'B' 206 and remote videoconference user 'F' 914, selected for display on videoconference screen 230 in an implementation of virtual omni-directional camera array 402 in accordance with an embodiment of the invention. In this depiction, videoconference screen 230 comprises partial screen views of local videoconference users 'B' 206, remote videoconference user 'F' 914, and local videoconference user thumbnails 'A' 904, 'C' 908, 'D' 910, and 'E' 912. In this embodiment of the invention, audio streams from microphones implemented on local videoconference computers 'A' 314, 'B' 316, 'C' 318, 'D' 320, 'E' 322, and remote videoconference computer 'F' 426 are captured and analyzed by an audio stream processing algorithm implemented on video control system (VCS) 122 to selectively switch or combine the video streams from virtual omni-directional cameras 'A' 304, 'B' 306, 'C' 308, 'D' 310, and 'E' 312, comprising omnidirectional camera array 402, and remote video conference camera 'F' 424.

In this same embodiment of the invention, local user 'B' 210 and remote user 'F' 924 have been determined to be concurrently speaking in a videoconference by an audio stream processing algorithm implemented in VCS 122, which selects the corresponding video stream of local user 'B' 206 and remote user 'F' 924 and presents them as concurrent, partial-screen video view images on videoconference screen 230, with local videoconference user thumbnails 'A' 904, 'C' 908, 'D' 910, and 'E' 912, being similarly displayed. In another embodiment of the invention, if two or more participants are speaking within a predetermined time interval, their respective video streams are combined into a composite video view.

In another embodiment of the invention, manual overrides allow videoconference participants to select predetermined video streams as their primary video view for the videoconference. In another embodiment of the invention, a videoconference facilitator or operator selects the primary or composite view for the videoconference from thumbnail images representing available video streams. In yet another embodiment of the invention, remote user 'F' 924 selects the desired video stream to be viewed on videoconference screen 230, by selecting video streams represented by local videoconference user thumbnails 'A' 904, 'B' 906, 'C' 908, 'D' 910, and 'E' 912.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for displaying video on information handling systems, comprising:
    a plurality of information handling systems;
    a plurality of video cameras operably coupled to said plurality of information handling systems, wherein each of said plurality of video cameras comprises a local angle of view and each of said information handling systems is operable to generate a video stream comprising said local angle of view; and
    a video control system operably coupled to said plurality of information handling systems;
        wherein said video control system is operable to select predetermined subsets of said video streams and generate a composite video display therefrom; and
        wherein the video image size of each of said predetermined video streams within said composite video display is respectively dependent upon said corresponding local angle of view.

2. The system of claim 1, wherein said plurality of information handling system comprises a set of information handling systems that are physically co-located.

3. The system of claim 2, wherein said plurality of information handling systems further comprises a set of information handling systems that are not physically co located.

4. The system of claim 3, wherein said set of co-located information handling systems are operably coupled to said set of remotely located information handling systems by a broadband network.

5. The system of claim 4, wherein said broadband network is implemented using a Realtime Communications Protocol (RTC).

6. The system of claim 5, wherein said video control system is further operable to concatenate said predetermined video streams from said set of physically co-located information handling systems to generate a virtual panoramic view within said composite video image.

7. The system of claim 1, wherein said set of physically co-located information handling systems further comprise audio input devices.

8. The system of claim 7, wherein said video control system is further operable to receive audio signals from said audio input devices and to selectively mix said audio signals to create a virtual array microphone therefrom.

9. The system of claim 8, wherein said video control system is further operable to process said audio signals to generate control signals to selectively switch or combine said predetermined subsets of video streams for said generation of said composite video display.

10. The system of claim 9, wherein said video control system is further operable to process said audio signals to generate a control signal to select a video stream from an individual information handling system as a primary video image for display within said composite video display.

11. A method of displaying video on information handling systems, comprising:
    using a plurality of information handling systems;
    using a plurality of video cameras operable connected to said plurality of information handling systems, wherein each of said plurality of video cameras comprises a local angle of view and each of said information handling systems is operable to generate a video stream comprising said local angle of view; and
    using a video control system operably coupled to said plurality of information handling systems;
        wherein said video control system is operable to select predetermined subsets of said video streams and generate a composite video display therefrom; and
        wherein the video image size of each of said predetermined video streams within said composite video display is respectively dependent upon said corresponding local angle of view.

12. The method of claim 11, wherein said plurality of information handling system comprises a set of information handling systems that are physically co-located.

13. The method of claim 12, wherein said plurality of information handling systems further comprises a set of information handling systems that are not physically co-located.

14. The method of claim 13, wherein said set of co-located information handling systems are operably coupled to said set of remotely located information handling systems by a broadband network.

15. The method of claim 14, wherein said broadband network is implemented using a Realtime Communications Protocol (RTC).

16. The method of claim 15, wherein said video control system is further operable to concatenate said predetermined video streams from said set of physically co-located information handling systems to generate a virtual panoramic view within said composite video image.

17. The method of claim 1, wherein said set of physically co-located information handling systems further comprise audio input devices.

18. The method of claim 17, wherein said video control system is further operable to receive audio signals from said audio input devices and to selectively mix said audio signals to create a virtual array microphone therefrom.

19. The method of claim 18, wherein said video control system is further operable to process said audio signals to generate control signals to selectively switch or combine said predetermined subsets of video streams for said generation of said composite video display.

20. The method of claim 19, wherein said video control system is further operable to process said audio signals to generate a control signal to select a video stream from an individual information handling system as a primary video image for display within said composite video display.

* * * * *